(12) United States Patent
Noe

(10) Patent No.: US 9,382,129 B2
(45) Date of Patent: Jul. 5, 2016

(54) URANIUM RECOVERY FROM UF6 CYLINDERS

(71) Applicant: TRANSPORT LOGISTICS INTERNATIONAL, INC., Fulton, MD (US)

(72) Inventor: Ronald O. Noe, Hopkins, SC (US)

(73) Assignee: Transport Logistics International, Inc., Fulton, MD (US)

( * ) Notice: Subject to any disclaimer, the term of this patent is extended or adjusted under 35 U.S.C. 154(b) by 197 days.

(21) Appl. No.: 13/776,785

(22) Filed: Feb. 26, 2013

(65) Prior Publication Data

US 2016/0122199 A1    May 5, 2016

(51) Int. Cl.
| | | |
|---|---|---|
| C01G 43/00 | (2006.01) | |
| C01G 43/01 | (2006.01) | |
| C23G 1/02 | (2006.01) | |

(52) U.S. Cl.
CPC ............... *C01G 43/01* (2013.01); *C01G 43/00* (2013.01); *C23G 1/02* (2013.01)

(58) Field of Classification Search
None
See application file for complete search history.

(56) References Cited

U.S. PATENT DOCUMENTS

| | | | |
|---|---|---|---|
| 4,024,215 A | | 5/1977 | Caropreso et al. |
| 4,311,678 A | * | 1/1982 | Jacob et al. ................. 423/19 |
| 4,518,569 A | * | 5/1985 | Perrot et al. ................ 423/19 |
| 2009/0269261 A1 | | 10/2009 | Kim et al. |

OTHER PUBLICATIONS

Hotoku, et al. "Clean out of empty uranium hexafluoride cylinder" JAEA—Technology (2009) 2009-52, i-iv, 1-14.*
Translation of Hotoku, et al. (2009).*
Nuclear Energy—Packagings for transport of uranium hexafluoride (UF6); ISO 2010; pp. 1-33.
The international transport of radioactive uranium hexafluoride (UF6); UK P&I Club, Carefully to Carry; 18 pages (Technical Document).
Judson L Kenoyer et al: "ORAU Team Dose Reconstruction Project for NIOSH, Oak Ridge Associated Universities I Dade Moeller & Associates I MJW Corporation Site Profile for Allied Chemical Corporation Plant New Total Rewrite Revision Page Change for Documents Marked as a Total Rewrite, Revision, Or Page Change, Replace The PRI", XP055147919, 28 pages, Feb. 1, 2006.
European Search Report EP14156885, dated Oct. 22, 2014.

* cited by examiner

*Primary Examiner* — Steven Bos
(74) *Attorney, Agent, or Firm* — Winston & Strawn LLP

(57) ABSTRACT

A process for recovering residual uranium from emptied uranium hexafluoride shipping cylinder during cleaning, including rinsing a uranium hexafluoride shipping cylinder with hydrofluoric acid to dissolve a heel of uranium hexafluoride therein to form a mixture of sediment, precipitates and a uranium solution; separating the uranium solution from the sediment and precipitates; mixing sodium hydroxide with the uranium solution to precipitate sodium diuranate; separating the solid sodium diuranate from the sodium fluoride solution formed; re-dissolving the sodium diuranate in sodium carbonate solution to form uranyl carbonate complex solution; and adjusting the pH of uranyl carbonate complex solution further to precipitate uranyl peroxide with the addition of hydrogen peroxide. Sodium fluoride solution produced is further treated to remove fluoride by percolating it through a calcite limestone bed to form calcium fluoride solid.

18 Claims, 1 Drawing Sheet

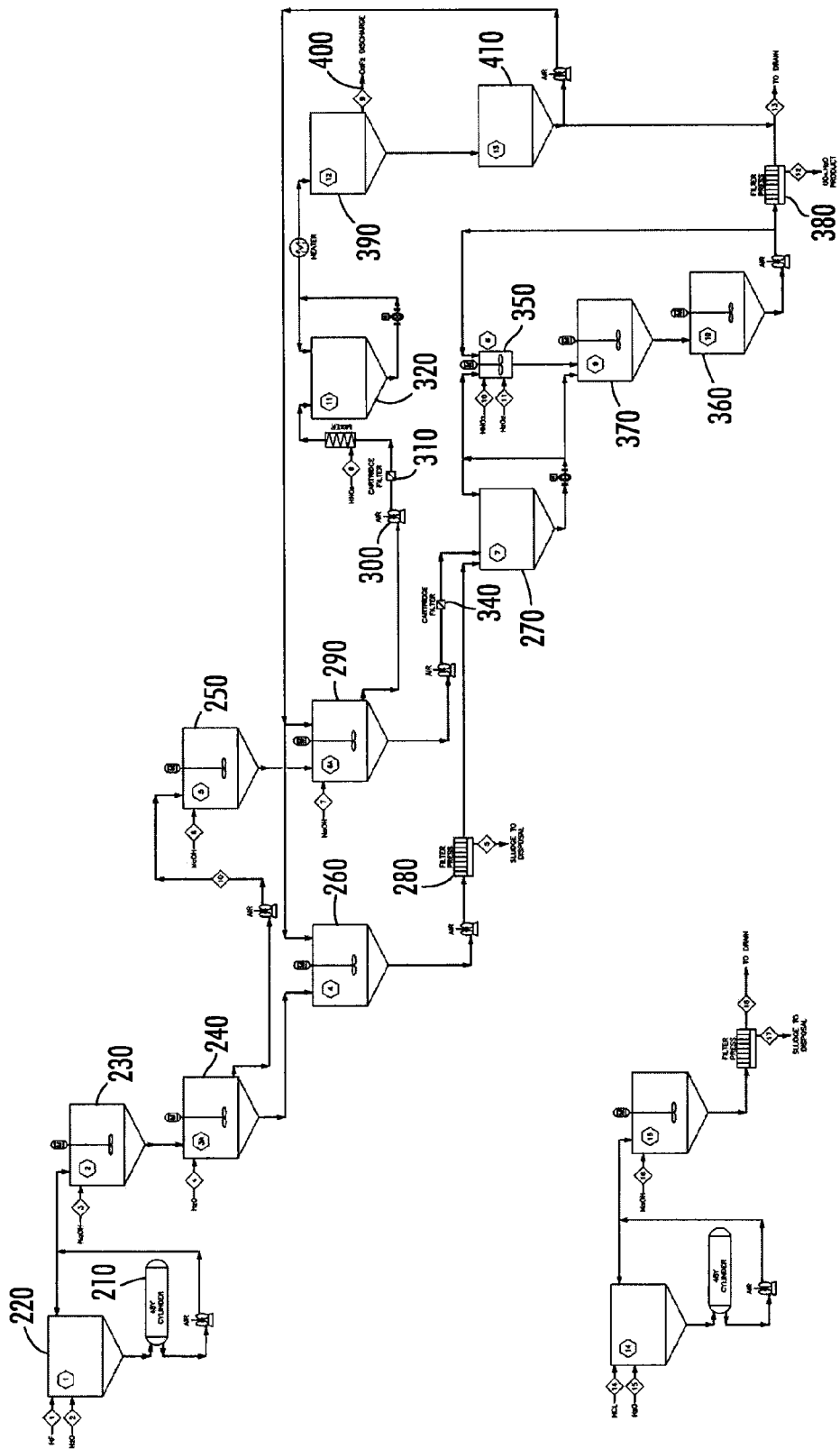

URANIUM RECOVERY FROM UF6 CYLINDERS

PRIORITY CLAIM

None.

BACKGROUND OF THE INVENTION

Worldwide, commercial quantities of uranium hexafluoride ($UF_6$) are stored and shipped in certified steel cylinders having 30-inch and 48-inch diameter. In order to remain in use, each of these $UF_6$ cylinders must be washed internally and re-certified every five years. As part of the cylinder washing process, a small residue of UF6, called a heel, in the otherwise empty $UF_6$ cylinder is first flushed with water from the cylinder's interior. Then the $UF_6$ cylinder is subjected to a series of tests designed to verify its physical integrity. Successful completion of the physical testing re-certifies the $UF_6$ cylinder for five additional years of service.

Cylinder washing and re-certification testing are usually performed as an ancillary effort at UF6 fabricators, enrichment facilities or conversion plants.

SUMMARY OF THE INVENTION

The present invention is directed to a method for removing the heel and recovering the residual uranium as part of the process of washing and recertifying an empty $UF_6$ cylinder and doing so in a facility dedicated to this process so that the more rigorous cylinder washing process can be done with economies of scale and to off-set to some extent the cost of cylinder washing by the resale of the valuable uranium recovered, and thereby result in a cleaner $UF_6$ cylinder that may remain in use longer. The phrase "empty cylinder" is used not in the literal sense (i.e., completely empty) but in the practical sense, that is, all the uranium hexafluoride has been removed from the cylinder except the residual heel of $UF_6$ and that trapped by the scale on the cylinder's interior surface. Inevitably, the repeated use of these $UF_6$ cylinders results in the build-up of the heel of $UF_6$. The present method removes that heel as well as the scale.

The present method not only includes steps to remove the heel and the scale but also to recover uranium from the wash solutions that result from the cylinder wash process. A usable, high-purity uranium by-product can be recovered from washing the $UF_6$ cylinders. Cylinder integrity testing steps, according to the prior art, follow the washing of the cylinders, which testing steps are not part of the present invention.

The invention also relates to a process for recovering residual uranium from empty uranium hexafluoride shipping cylinders during cleaning. This process includes the steps of:
(a) collecting plural empty uranium hexafluoride cylinders;
(b) weighing each cylinder of said plural cylinders to determine the mass of a heel of uranium hexafluoride contained by said each cylinder;
(c) adding hydrofluoric acid to said each cylinder;
(d) exposing the interior of said each cylinder to said hydrofluoric acid to dissolve said heel and form a uranium solution;
(e) emptying said uranium solution from each cylinder into a tank;
(f) rinsing said each cylinder with water;
(g) determining a uranium concentration of said water;
(h) re-rinsing said each cylinder with water if said uranium concentration exceeds 3000 ppm; and
(i) processing contents of said tank to recover said uranium.

BRIEF DESCRIPTION OF THE DRAWINGS

In the drawings,
FIG. 1 is a schematic diagram of the present process, according to an embodiment of the invention.

DETAILED DESCRIPTION OF EMBODIMENTS

The present process is an improved version of the sodium diuranate (SDU) process that substantially improves the effectiveness of the prior art process by substantially improving the purity of the recovered uranium. The first part of the present process enhances the cleaning the $UF_6$ cylinder by adding a dilute solution of hydrofluoric (HF) acid rather than water as the first wash medium, which step is then followed by one or more water rinses. The HF assures an adequate supply of cleansing agent to remove scale (primarily $Fe_2O_3$) adhering to the interior wall of the cylinder. The present method processes the used wash solution to recover the uranium in it by a series of chemical additions and settling operations to isolate the uranium.

Each $UF_6$ cylinder is prepared for washing by checking its weight to estimate the residual heel of $UF_6$. The weight of the heel is related to the amount of HF needed in the first wash solution. The cylinder is then placed on a roll/tilt table (not shown) and the cylinder valve is attached to a supply hose from an HF wash acid supply tank in which a prepared 15 gallon batch of HF serves as the primary wash solution. After accounting for the amount of $UF_6$ heel, the rinse solution in wash acid supply tank is adjusted by addition of commercially available 49% HF make-up acid to increase the strength of the wash solution so that 15 gallons of 7% HF wash acid can be delivered into each $UF_6$ cylinder. After the cylinder valve is opened, the 15 gallons of acid is drained into the cylinder from supply tank. The cylinder valve remains open until the pressure inside the cylinder equilibrates with ambient pressure. Then the valve is closed and the supply hose is disconnected.

The first $UF_6$ cylinder then is processed through a horizontal/tilt-up/tilt-down roll program on the table to assure the wash solution contacts all the internal surfaces of the container. The tilt/roll program stops with the cylinder valve in the tilt down position. A pump-out hose is then attached to the cylinder valve, the valve opened, and the wash solution pumped from cylinder into a first reaction tank for its first treatment. The cylinder is then raised to the horizontal position and 14 gallons of rinse water is drained through the pump-out hose into the cylinder. The cylinder valve is again closed and the hose disconnected from the cylinder valve. The cylinder proceeds through a second horizontal/tilt-up/tilt-down roll program to thoroughly rinse the cylinder's interior surface. The roll program again stops with the cylinder valve in the tilt-down position. The hose is re-connected and the valve is opened to allow the rinse solution to be pumped into the rinse water batch tank (not shown). A sample of the rinse solution is analyzed for uranium concentration. If the sample contains less than 3,000 ppm uranium, the cylinder is deemed to have been satisfactorily cleaned. The hose is then disconnected from the valve and the cylinder removed from the tilt/roll table.

If the rinse sample result contains more than 3,000 ppm, the rinse water is pumped from the rinse water batch tank to the first reaction tank thereby adding it to the wash solution for the first treatment step. Next a second 14-gallon increment of rinse water is added to the $UF_6$ cylinder for a second rinse using the tilt-/tilt-down roll program on the tilt-up/tilt-down roll table. This rinse sequence is repeated until the rinse sample tests below 3,000 ppm for uranium.

The washing chemistry and stoichiometric material balances are as follows:

$$UF_6+2H_2O=UO_2F_2+4HF \quad (1)$$

352 g+36 g=308 g+80 g $$Fe_2O_3+6HF=2FeF_3+3H_2O \quad (2)$$

160 g+120 g=226 g+54 g

The first treatment step takes place in the first reaction tank. Wash solution freshly drawn from a $UF_6$ cylinder is a mixture of dissolved $UO_2F_2$, dissolved contaminant compounds (mostly iron), and 3%-5% solid sediments (mostly $FeF_3$). The pH of this mixture is usually 3-3.5. The first treatment step is mixing in sufficient NaOH solution to increase the pH to about 5.5 wherein a large part of the soluble contaminants precipitate. Much of the $UO_2F_2$ will remain in solution at this pH. The 5.5 pH mixture is then pumped into a first settling tank to allow the sediments and precipitates to settle out. The clear liquid portion, which contains nearly all the uranium, is then transferred into a second reaction tank using a conventional floating suction technique that separates a liquid phase from a solid residue or other convenient means for separating liquids from solids.

The settled solids, along with whatever clear liquid is left after the separation, may be slurried using a mixer into a third reaction tank for scavenging, with a $Na_2CO_3/NaHCO_3$ solution, remnant uranium that may have precipitated or is entrained with the sediments. A small amount of NaOH plus the $Na_2CO_3/NaHCO_3$ solution (which may be recycled from the fluoride removal process of Step 4 below) is added to bring the pH of the solution in the third reaction tank to about 10 where any residual uranium will be converted to soluble carbonate complexes. The sediment and precipitates are then allowed to settle to the bottom of the third reaction tank and the uranium-bearing clear solution is then pumped out, once again using a floating suction technique. This clear solution re-joins the main uranium stream at the carbonate solution storage tank downstream in the process. The remaining sediment solids are then filtered and the filter cake is disposed of as waste.

The initially-separated, clear liquid in the second reaction tank consists is primarily of $UO_2F_2$ with a small amount of residual HF and a very small remnant of impurities. This solution is treated to separate most of the fluoride content from the uranium by adding enough NaOH solution to bring the mixture to pH 12. This action precipitates the uranium as sodium diuranate (SDU) and leaves fluoride in solution as sodium fluoride. The chemical reactions and stoichiometry are:

$$2UO_2F_2+6NaOH=Na_2U_2O_7+4NaF+3H_2O \quad (3)$$

616 g+240 g=634 g+168 g+54 g $$HF+NaOH=NaF+H_2O \quad (4)$$

20 g+40 g=42 g+18 g

The mixture is stirred to assure the reaction completes before being pumped to a second settling tank, where the SDU is allowed to settle to the bottom of the tank. The clear NaF solution is then separated from SDU using floating suction, or other convenient means, and the separated fluid is passed through polishing cartridge filters 310 to a fourth treatment tank for further processing to remove fluoride.

The remaining SDU precipitate in the second settling tank is slurried with part of the sodium carbonate solution generated from the fluoride removal (described in Step 4 below) and pumped into a fourth reaction tank. There, the mixture is adjusted to pH 10.1 to create the condition where $NaHCO_3$ is the predominant carbonate species and the SDU precipitate re-dissolves as a uranium carbonate complex. Heating and continued agitation is used to facilitate dissolution. Uranyl carbonate solution, generated from the sediment rinse treatment, is also added to this tank. The chemistry and stoichiometry of this step are:

$$Na_2U_2O_7+6Na_2CO_3+3H_2O=2Na_4UO_2(CO_3)_3+ 6NaOH \quad (5)$$

634 g+504 g+54 g=1,084 g+240 g

The pH of the NaF solution decanted from the SDU precipitate is adjusted from pH 12 to pH 6.5-7.5 by adding 20% nitric acid, heated to about 80 deg C., then percolated through a high-calcium calcite limestone ($CaCO_3$) bed in the fifth treatment tank 370. The fluoride reacts with the calcium in the calcite to form a calcium fluoride solid which remains in the calcite bed as part of the calcite structure. The reaction also liberates carbonate ion ($CO_3$) which associates with the sodium left to form a $NaHCO_3/Na_2CO_3$ solution mixture as the solution exits the fifth treatment tank. This solution is normally a dischargeable waste, but, within this process, part of it recycles and becomes a reagent for the uranium re-dissolving. The chemistry and stoichiometry of this step are:

$$2NaF+CaCO_3=CaF_2+Na_2CO_3 \quad (6)$$

84 g+100 g=78 g+106 g

The final step of the process is to recover the uranium as a high-purity uranyl peroxide precipitate. In order to do so, the pH of the reaction mixture for this process needs to be carefully controlled at 4.0+/−0.1 for complete uranium recovery. At pH of 2.0 the precipitation reaction stops entirely while, if the pH rises above 4.5, consumption of the precipitation reagent, hydrogen peroxide, increases dramatically. The reaction tank, the sixth reaction tank, for this step can be quite small, about five gallons total volume. Since the main supply of uranyl carbonate complex solution has a pH of about 10, a small amount of nitric acid is added to sixth reaction tank along with a slurry of a small amount of acidified uranyl peroxide seed crystal to initiate the peroxide precipitation reaction. Once the precipitation starts, the reaction will create its own acidification and drive the pH down quickly as the precipitation progresses. The chemistry and stoichiometry of these reactions are:

$$Na_4UO_2(CO_3)_3+6HNO_3=UO_2(NO_3)_2+3CO_2+3H_2O+ 4NaNO_3 \quad (7)$$

542 g+378 g=394 g+132 g+54 g+340 g $$UO_2(NO_3)_2+H_2O_2+H_2O=UO_4H_2O+2HNO_3 \quad (8)$$

394 g+34 g+18 g=320 g+126 g

To limit the new acid produced so that a 4.0 pH is maintained, uranyl carbonate solution may be added. With pH control and a metered-in supply of hydrogen peroxide, a continuous, sustained precipitation reaction can be maintained simply by balancing the input flows to keep a steady 4.0 pH condition in sixth reaction tank. The overflow from the sixth reaction tank is routed to an intermediate precipitator tank having a volume of about 30 gallons wherein the precipitation slurry is stirred to promote full precipitation as the reactants are adjusted by small additions if the conditions begin to drift off the target 4.0 pH. Finally, the overflow from the intermediate precipitator tank goes to a large, gently-agitated, digester tank to give several hours of digestion time to complete the precipitation. A small recycle stream from digester tank back to the sixth reaction tank is used to provide the seed crystals to assist initiating the precipitation. Once digester tank is nearly full and given sufficient reaction time, the soluble uranium in it will decrease to about 1 ppm U at which time the stream is drawn off tank through a filter to recover the uranyl peroxide crystals. The filtrate, which is primarily a solution of sodium nitrate, plus excess sodium carbonate generated from the fluoride removal are combined for disposal.

By way of example, the basis for batch material balance calculations is a 5 kg UF6 heel being washed from a 48Y UF6 cylinder with 15 gallons (58 liters) of 7% HF wash water.

$UO_2F_2$ produced (Eq 1): 5,000/352×308=4,375 gm (about 75 gm/l).

HF produced (Eq 1): 5,000/352×80=1,136 gm.

HF in original wash water: 15 gal×8.42 lb/gal×0.07× 454 gm/lb=4,014 gm.

Total HF per batch=1,136+4,014=5,150 gm.

Note that a small, indeterminate amount of the HF involved will be consumed by the reaction in the second equation above, but for purposes of material balance, it is ignored.

NaOH needed (Eq 3): 4,375/616×240=1,704 gm.

NaOH needed (Eq 4): 5,150/20×40=10,300 gm.

Total NaOH needed per batch=1,704+10,300=12,004 gm.

If 8M NaOH is supplied (about 25 wt % @ 1,270 gm/l), the amount of NaOH needed is: 12,004/1,270×0.25=37.8 liters or about 10 gallons per batch.

SDU produced (Eq 3): 4,375/616×634=4,503 gm.

For carbonate dissolution of SDU (Eq 5):

$Na_2CO_3$ is needed (Eq 6): 4,503/634×636=4,517 gm.

$Na_2CO_3$ generated (Eq 5): 12,008/84×106=15,153 gm.

Therefore, about 30% of the $Na_2CO_3$ generated from fluoride removal (as described in Step 4) is recycled for SDU dissolution.

NaF produced (Eq 3): 4,375/616×168=1,193 gm.

NaF produced (Eq 4): 5,150/20×40=10,815 gm.

Total NaF produced per batch=1,193+10,815=12,008 gm (about 125 gm/l).

Calcite needed for fluoride removal (Eq 6): 12,008/84×100=14,295 gm.

@ 80% efficiency, calcite needed is: 14,295/0.8=17,869 gm per batch.

Precipitation of UO4 from carbonate solution:

$Na_4UO_2(CO_3)$ generated (Eq 6): 4,503/634×1,084=7,699 gm.

$HNO_3$ needed (est) (Eq 7): 7,699/542×378=5,369 gm.

Note that the $HNO_3$ requirement is estimated high, since a significant amount is regenerated from the peroxide precipitation itself (see Eq 8) and, with the carbonate addition, helps perpetuate the precipitation via control of the pH.

$UO_2(NO_3)_2$ produced from acidification (Eq 7): 7,699/542×394=5,597 gm.

$H_2O_2$ needed (Eq 8): 5,597/394×34=483 gm.

@ recommended excess of 40%, $H_2O_2$ needed is 483× 1.4=676 gm.

If $H_2O_2$ is supplied as 35 wt %, the weight of $H_2O_2$ needed: 676/0.35=1,931 gm.

@ density of 35% $H_2O_2$=1.14 gm/cc, volume needed is 1,931/1.14=1.694 liters or 1.694/3.875=0.44 gallons.

The following is an example of reagent requirements for processing one 48Y UF6 cylinder through washing and uranium recovery, including the effluents expected. These requirements can be used to estimate different cylinder production rates.

For washing acid preparation, assuming a 49% supply, the HF needed is 8,192 gm. The volume of HF is 6.94 liters (1.79 gallons). In addition, 51.1 liters (13.2 gallons) of new water or water from a previous cylinder rinse are needed.

Wash solution adjustment to pH 5.5 requires approximately 5.8 liters (1.5 gallons) 8M NaOH. Precipitation of SDU at pH 12.0 requires 33 liters (8.5 gallons) 8M NaOH, for a total of 39 liters (10 gallons) 8M NaOH.

Neutralization from pH 12.0 to pH 7.0 of the roughly 93 liters (24 gallons) of NaF solution produced prior to fluoride removal requires about 115 grams of 20% nitric acid. Additionally, initiation of the peroxide precipitation requires an estimated 10% of the stoichiometric amount or about 2,700 grams of 20% nitric acid for a total of about 3 liters (0.8 gallons).

Approximately 17,869 grams or about 18 kg (40 lb) of calcite is required.

Approximately 1,931 (0.5 gallons) of 35 wt % hydrogen peroxide is required.

Process effluent is approximately 100 liters (26 gallons) of liquid containing about 2,530 gm $NaNO_3$ (25 gm/l) plus 10,635 gm $Na_2CO_3$ (106 gm/l). Solid waste discharge would be about 14 kg of $CaF_2/CaCO_3$ mixture per cylinder plus about 0.5 kg of iron precipitates separated from the wash solution prior to SDU precipitation.

Referring now to FIG. 1, a cylinder 210, such as a 48Y $UF_6$ cylinders, is not part of the present system but is the work piece for the first portion of the present method. Each cylinder 210 is placed on tilt/roll table, such as the WRU10PT tilt/roll table made by Koike Aronson Ransome Company, or equivalent, and processed through wash and rinse cycles to remove UF6 heels and interior wall scale developed during cylinder 210's service life. The 7% HF acid wash solution is prepared in a first batch tank 220 and pumped into cylinder 210 for the washing cycle. The liquid from this first washing is pumped into a first reaction tank 230 and rinse water is pumped into cylinder 210. After the rinse cycle is complete, the rinse water is tested for uranium, then brought up to 7% HF strength with added 49% HF to be used as the wash solution for the next cylinder.

After the wash liquid in second batch tank 230 is mixed with a small amount (approximately 5.8 liters or 1.5 gallons) of 8M NaOH solution to adjust it to pH 5.5, then it is discharged to a settling tank 240. The mixture settles to an estimated 95% volume clear liquid above 5% volume of sediments and precipitates. Next, settling tank 240 is decanted via a floating suction by a pump that transfers the clear solution into precipitation tank 250. The sediment in settling tank 240 is slurried with 4 liters (1 gallon) water and 2 liters (0.52 gallons) of $Na_2CO_3$ solution from the fluoride removal process and its contents transferred to a sediment mixing tank 260. The slurry mixture in sediment mixing tank 260 is pH adjusted to pH 10.1 and mixed to convert carry-over uranium into soluble uranyl carbonate. Mixing is then stopped and sediments are allowed to settle. The clear liquid in sediment mixing tank 260 is decanted to uranyl carbonate storage tank 270. The sediments in sediment mixing tank 260 are slurried using another 5 gallons of $Na_2CO_3$ solution and filtered to remove the solids, which may be accomplished by using filter press 280. The filtrate is also added to uranyl carbonate storage tank 270. The sediment filter cake may be air-dried and discarded.

The clear $UO_2F_2$ solution in precipitation tank 250 is precipitated by slowly mixing in enough (est. 25.5 gal) of an 8M NaOH solution to increase the pH to 12.0. The precipitate slurry is mixed for two hours to promote particle size growth, then dumped to a SDU settling tank 290. The slurry settles for a minimum of 12 hours or overnight, perhaps longer if it is slow to settle. The clear liquid from SDU settling tank 290 is decanted through a pump 300 and cartridge filter 310 to a NaF solution storage tank 320. About 22 gallons of $Na_2CO_3$ solution from the fluoride removal process are mixed in the SDU sediments in SDU settling tank 290 and the pH is adjusted to 10.1, which favors formation of $NaHCO_3$. The sediments are mixed for sufficient time to re-dissolve the SDU into soluble carbonates. The carbonate solution is then pumped through a cartridge filter 340 into tank uranyl carbonate storage tank 270. Any un-dissolved sediment caught by cartridge filter 340 is considered an impurity and added to sediment mixing tank 260 for additional $Na_2CO_3$ treatment and discard.

If uranyl carbonate storage tank 270 is sized to hold plural batches uranyl carbonate solution. It can be set up for peroxide precipitation and uranium recovery in periodic campaigns or on a steady daily operation. The precipitation consists of a three-step operation using three separate tanks. In first precipitation tank 350 all components are vigorously mixed in order to combine them quickly at the start of the precipitation. Flows of uranyl carbonate solution, 20% nitric acid, 35% hydrogen peroxide, and $UO_4$ seed slurry from a third precipitation tank 360 are all introduced into first precipitation tank 350 in ratios that create a pH of about 2.5 to initiate $UO_4$ precipitation. Overflow from first precipitation tank 350 goes into a second precipitation tank 370 where additional uranyl carbonate solution is added to control the pH at about 4.0. Overflow from second precipitation tank 370 goes into third precipitation tank 360 where the mixture is agitated gently for several hours to complete precipitation. After the liquid portion in third precipitation tank 360 falls to 1 ppm U, a side stream of slurry is withdrawn through a filter press 380 to recover the $UO_4$ crystals. Filtrate from filter press 380 is discarded as a waste stream. The UO4 crystals recovered from the press are dried and packaged as product.

The NaF solution in NaF solution storage tank 320 is further treated to remove the fluoride by percolating it through a bed of calcite particles contained in calcite bed tank 390. The solution is neutralized to pH 7.0 with 20% nitric acid, heated to about 80 degrees C., and pumped through a distributor pipe 400 at the top of the calcite bed tank 390. As it trickles through the calcite, the fluoride reacts with the calcium in the calcite to form calcium fluoride ($CaF_2$) solid while the sodium combines with the carbonate ion released to form $Na_2CO_3$ solution (see Eq 6 above). The $CaF_2$ forms in such a way as to retain the granular structure and location of the original calcite particles thereby avoiding the need for a filtration separation step. The spent calcite bed is periodically—perhaps every three months, depending on use—removed and discarded as the calcite is exhausted then replaced with fresh calcite. The $Na_2CO_3$ solution is transferred to storage tank 410 for recycle to the SDU dissolution in sediment mixing tank 260 or for effluent waste disposal.

Tanks may be cone-bottomed, full-drain, polyethylene tanks such as those manufactured by U.S. Plastics for most of the process tanks and a stainless steel tank for calcite bed tank 390 because of their low cost and chemical resistance. Double-diaphragm air-driven pumps and industrial propeller blade mixers are suitable for the present system.

In an embodiment of the present invention, a facility would be established for washing empty uranium hexafluoride shipping containers and recovery of the uranium that results from removal of the heel in those containers. The process is inherently a batch process as each cylinder is washed one at a time, although parallel wash lines can be established. Washed cylinders are forwarded to sources of uranium hexafluoride for refilling.

Those skilled in radioactive waste chemistry would appreciate that many modifications and substitutions may be made to the foregoing embodiments of the invention without departing from the spirit and scope of the present invention, which is defined by the appended claims.

What is claimed is:

1. A process for recovering residual uranium from an empty uranium hexafluoride shipping container during cleaning, said process comprising the steps of:
    (a) rinsing the interior of a uranium hexafluoride shipping container with hydrofluoric acid in order to clean the interior wall of the container and to dissolve a heel of uranium hexafluoride therein and form a uranium solution;
    (b) obtaining said uranium solution from said container;
    (c) mixing sodium hydroxide with said uranium solution from said container for precipitating sodium diuranate from said solution while also forming sodium fluoride;
    (d) dissolving said sodium diuranate in a solution that contains carbonate to form a uranium carbonate complex;
    (e) separating sodium fluoride from said uranium solution; and
    (f) precipitating uranyl peroxide from said uranium carbonate complex solution.

2. The process as recited in claim 1, further comprising the step of weighing said shipping container to determine the mass of said heel of uranium hexafluoride.

3. The process as recited in claim 2, further comprising the step of determining the quantity of hydrofluoric acid needed to dissolve said mass of said heel of said uranium hexafluoride heel.

4. The process as recited in claim 1, wherein said rinsing step further comprises the step of using 7% hydrofluoric acid to rinse said shipping container.

5. The process as recited in claim 1, wherein said rinsing step further comprises the step of contacting all interior surfaces of said shipping container by rolling said shipping container while tilting said shipping container.

6. The process as recited in claim 1, further comprising the steps of
    (g) rinsing said shipping container with water after said hydrofluoric acid rinsing step; and (h) then sampling the uranium concentration of said water to verify said uranium concentration of said water is less than 3000 ppm.

7. The process of claim 1, wherein said dissolving step further comprises the steps of slurrying said sodium diuranate with a sodium carbonate solution to form a mixture, and adjusting pH of said mixture to re-dissolve said sodium diuranate in the carbonate solution as uranium carbonate complexes.

8. The process of claim 1, further comprising the step of adjusting pH of said sodium fluoride solution to 7.0 before percolating said solution through a calcite limestone bed to form calcium fluoride for removal from the solution.

9. The process recited in claim 1, further comprising the step of adjusting the pH of said uranium carbonate complex solution to about 4.0 to precipitate uranyl peroxide from the solution.

10. The process recited in claim 9 further comprising the step of controlling the pH of 4.0 to within 0.1 by adding uranyl carbonate solution.

11. A process for recovering residual uranium from empty uranium hexafluoride shipping cylinder during cleaning, said process comprising the steps of:
    (a) rinsing the interior of a uranium hexafluoride shipping cylinder with 7% hydrofluoric acid in order to dissolve a heel of uranium hexafluoride therein and form a mixture of sediment, precipitates and a uranium solution;
    (b) separating said uranium solution from said sediment and said precipitates;
    (c) mixing sodium hydroxide with said separated uranium solution to form a slurry of sodium diuranate solids in sodium fluoride solution;
    (d) separating said sodium fluoride solution from said sodium diuranate solids;
    (e) reacting sodium fluoride from said separated sodium fluoride solution with calcium carbonate to form calcium fluoride while liberating carbonate ions which associate with sodium to form a solution of sodium carbonates;
    (f) dissolving said sodium diuranate solids in a solution that contains carbonate to form a solution of uranium carbonate complexes;
    (g) adjusting the pH of said solution of uranium carbonate complexes to about 4.0 to precipitate uranyl peroxide from said solution; and
    (h) maintaining said pH at about 4.0.

12. A process for recovering residual uranium from empty uranium hexafluoride shipping cylinders during cleaning, said process comprising the steps of:
    (a) collecting plural empty uranium hexafluoride cylinders;
    (b) weighing each cylinder of said plural cylinders to determine the mass of a heel of uranium hexafluoride contained by said each cylinder;
    (c) adding hydrofluoric acid to said each cylinder;
    (d) exposing the interior of said each cylinder to said hydrofluoric acid to dissolve said heel and form a uranium solution;
    (e) emptying said uranium solution from each cylinder into a tank;
    (f) rinsing said each cylinder with water;
    (g) determining a uranium concentration of said water;
    (h) re-rinsing said each cylinder with water if said uranium concentration exceeds 3000 ppm; and
    (i) processing contents of said tank to recover said uranium.

13. The process as recited in claim 12, wherein said hydrofluoric acid is a 7% hydrofluoric acid solution.

14. The process as recited in claim 12, further comprising the step of forwarding said plural cylinders wherein said concentration of uranium is less than 3000 ppm to a facility for refilling with uranium hexafluoride.

15. The process as recited in claim 12, wherein said processing step further comprises the steps of:
    (j) separating sediment and precipitates from said uranium solution;
    (k) mixing sodium hydroxide with said uranium solution to precipitate sodium diuranate;
    (l) dissolving said sodium diuranate in a solution that contains carbonate to form a solution of uranium carbonate complexes; and
    (m) precipitating uranyl peroxide from said solution that contains carbonate.

16. The process as recited in claim 15, wherein said precipitating step further comprises the steps of:
    (n) adjusting the pH of said solution to about 4.0 to precipitate uranyl peroxide from said solution; and
    (o) maintaining said pH at about 4.0.

17. The process as recited in claim 1, wherein the rinsing of the interior of the container with hydrofluoric acid forms a mixture of sediment, precipitates and a uranium solution.

18. The process as recited in claim 17 which further comprises:
    separating the uranium solution from said sediment and said precipitates; and
    mixing sodium hydroxide with said uranium solution to precipitate the sodium diuranate.

* * * * *